SUBATOMIC RESONANCE STORAGE AND RECORDING PROCESS AND ARTICLE

Filed Sept. 29, 1960 2 Sheets-Sheet 1

INVENTORS
Harold C. Anderson
Kenneth E. Peltzer
BY
Alfred B. Levine
ATTORNEYS

SUBATOMIC RESONANCE STORAGE AND RECORDING PROCESS AND ARTICLE

Filed Sept. 29, 1960 2 Sheets-Sheet 2

INVENTORS
Harold C. Anderson
Kenneth E. Peltzer,
BY Alfred B. Levine
ATTORNEYS

United States Patent Office 3,238,511

Patented Mar. 1, 1966

3,238,511
SUBATOMIC RESONANCE STORAGE AND RECORDING PROCESS AND ARTICLE

Harold C. Anderson, Silver Spring, and Kenneth E. Peltzer, College Park, Md., assignors to Litton Systems, Inc., College Park, Md.

Filed Sept. 29, 1960, Ser. No. 59,342
20 Claims. (Cl. 340—173)

Figure 1:
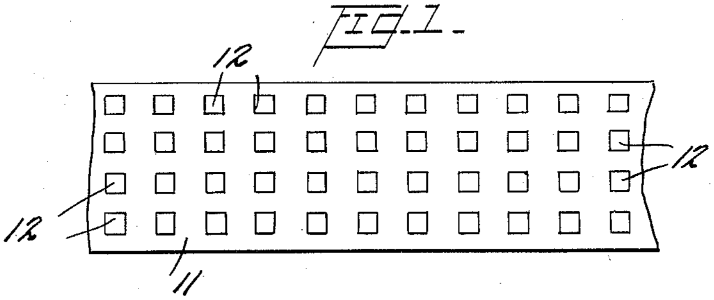

This invention generally relates to the storage of energy in orbiting subatomic particles and is particularly concerned with the direct recording of high-frequency radio waves on a record member by the excitation of subatomic particles, although the invention is not limited in this respect.

Since an important field of application of the present invention resides in a process for directly recording high-frequency radio waves in the higher megacycle ranges, the background and problems in this field will be first generally considered, and as the specification proceeds, the basic nature of the invention and its application in general to scanning, storage and other functions will become more evident to those skilled in the art.

In conventional methods of storing or recording information, a varying signal is applied to a moving record member by means of a transducer for converting the signal into a form suitable for varying the magnetic, optical, or physical characteristics of the record at differing amplitudes along the length of the member. For this reason, the highest frequency signal that can be stored or recorded in this manner is determined by the speed of moving the record past the transducer and the density of the recorded bits of information that can be stored on the record. This type of recording or storage of information, may be generally classified as recording in the time domain since the variations of the signal with time are recorded as an amplitude distribution along the length of a tape, wire, film, or disc.

At the higher frequencies, however, the amplitude variation of the signal with time occur more rapidly than can be captured by relative movement between the transducer and recording medium and at such frequencies, the intelligence cannot be recorded or stored in the recording medium in this manner. In other instances, it is desired to record more than the amplitude or envelope of the radio frequency signal but also to record the carrier and all of its sidebands. Using the known recording processes and techniques, this more complete information cannot presently be recorded.

According to the present invention, there is provided a considerably different process and system for storing and recording radio frequencies directly from the radio or electro-magnetic waves in which form the information is received without the need for a transducer device, and wherein either the complete wave form including the fundamental wave and its spectrum of harmonics is captured on the recording medium or alternatively where only a given frequency wave is recorded. In the former, there is recorded at each discrete position along the recording medium, the complete radio frequency wave form occurring at a given time instant whereby this complete wave form may be later reproduced from that position on the medium at will. In one respect this recording may be considered an image of the complete signal existing at that time instant or more specifically as a spectral frequency distribution of the component frequencies making up the complex wave form. The frequency range of this type of recording does not depend upon the speed of movement of the recording medium past a transducer as in the prior art processes, but rather upon presensitizing the record medium to the higher frequencies being recorded. Consequently, this process may record signals of considerably higher frequency than heretofore.

In its over-all aspects, the preferred process for recording in the frequency domain is performed by first providing a specially formed record member having a plurality of resonant circuit areas spacially dispersed along the member. Each of the resonant circuit areas is pretuned to the frequency which it is desired to record or store and each is accordingly made sensitive to direct exposure from a radio wave at that tuned frequency to absorb or collect energy from the wave. The radio wave to be recorded is then directed to excite all of the resonant circuit areas in a given region on the recording member whereby the energy from the wave is directly stored by those of the resonant areas that are tuned to the frequency components of the wave. For recording a spectral distribution of the radio wave, different areas in the region exposed to the wave are tuned to resonate at different frequencies whereby each of the spectral frequencies in the wave are stored at a different position on the record.

For the purpose of directly recording radio waves at frequencies that are considerably higher than can be recorded by other known processes, the resonant areas on the record member are comprised of solid state subatomic resonant circuits that are adapted to resonate in the kilomegacycle ranges whereby microwave radio signals in these extremely high frequency ranges may be directly recorded by this process.

As in the prior art recording techniques, the record member may be elongated and may be translated from position-to-position past the radio frequency wave to be recorded thereby to provide a series of recordings at different positions along the member, each representing an image or recording of the radio wave at a given time instant.

For playback of the recorded radio wave images on the member, the record member may be interrogated by a readback radio wave operating at the same range of frequencies as the recorded wave whereby those resonant areas on the member that have been previously disturbed in the recording process may be detected, and the previously stored information may be reproduced. Other processes of playback may be employed as will be disclosed hereafter in the specification.

It is accordingly an object of the invention to provide a process for directly recording radio frequency signals over a broad frequency band.

A further object is to provide such a process employing the resonant condition of electrons or other subatomic praticles.

Still another object is to provide such a process that does not employ a transducer but rather receives the information directly from a radio wave.

Still another object is to provide such a process that can directly record higher frequencies than heretofore, which frequencies lie in the microwave range of spinning subatomic particles.

It is a further and more general object of the invention to provide a frequency sensitive selective process for exciting discrete and separate physical areas on a member according to the frequency of a scanning source.

Figure 2:
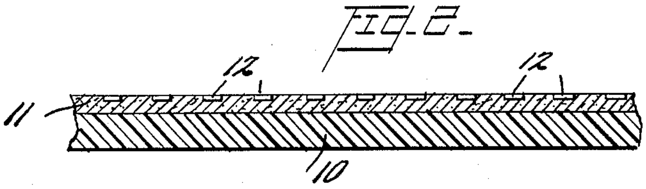
Figures 3, 7, 8:
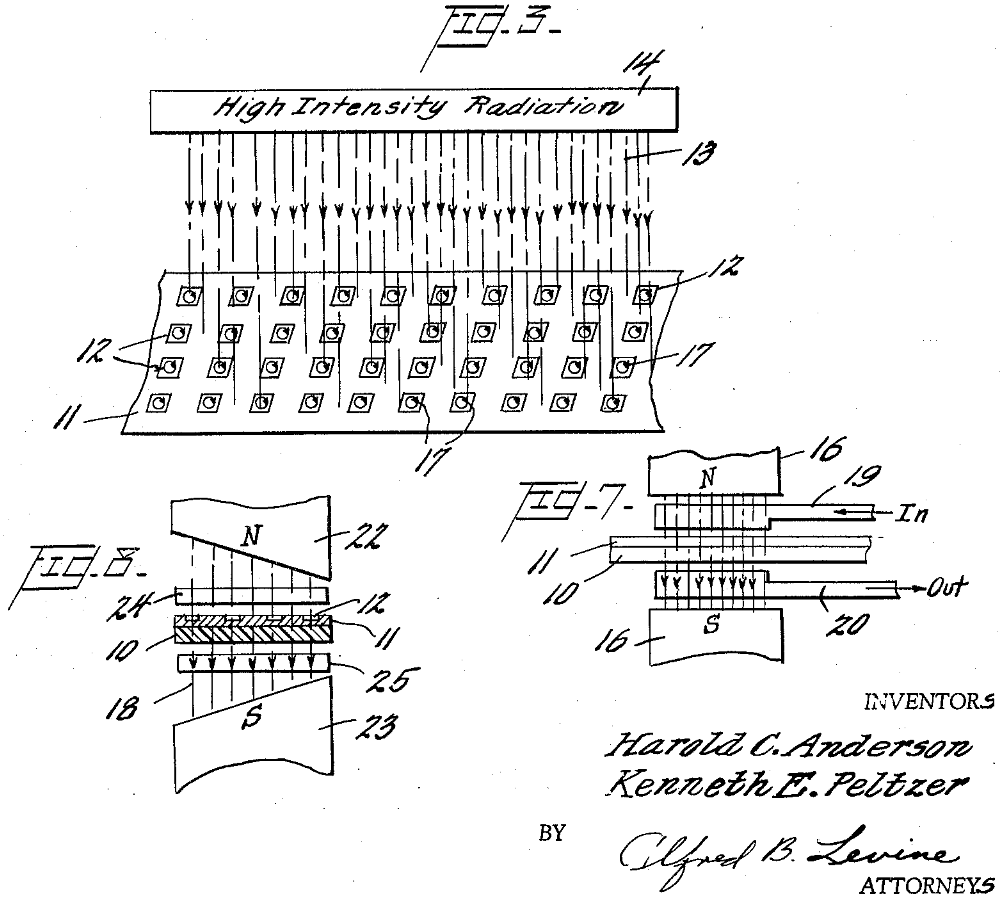
Figure 4:
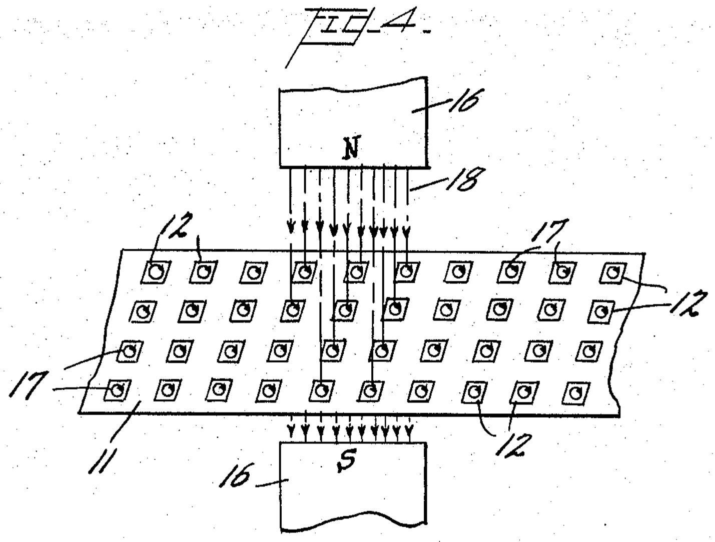
Figure 5:
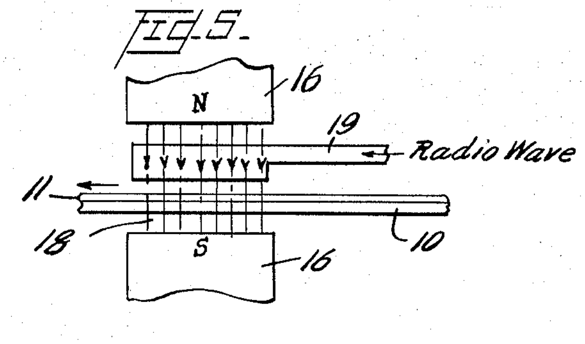
Figure 6:
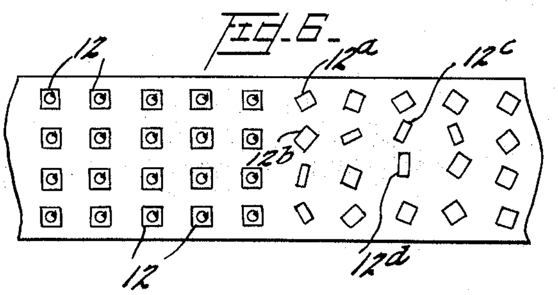

Other objects and many additional advantages will be more readily understood by those skilled in the art after a detailed consideration of the following specification taken with the accompanying drawings, wherein:

FIG. 1 is a plan view of one form of the record member according to the invention, FIG. 2 is a cross-sectional view of the record member of FIG. 1, FIG. 3 illustrates the process step of creating resonant circuit areas on the record of FIGS. 1 and 2, FIG. 4 illustrates a process step for tuning the resonant areas to a given frequency, FIG. 5 illustrates a process step for subjecting the presentitized record member to the radio wave to be recorded, FIG. 6 is a plan view similar to FIG. 1 and illustrating the record member having a region of recorded information, FIG. 7 generally illustrates one process step for reproducing or read out of the recorded information, and FIG. 8 illustrates a variation of the steps of FIGS. 5 and 6 for recording and read out of the information in the frequency domain.

Preliminary to a detailed consideration of a preferred recording process according to the invention, it is believed helpful to consider briefly and nonrigorously some of the known characteristics of paramagnetic resonance phenomena, ferromagnetic, and similar frequency sensitive spin states. For a more detailed background, reference is made to the extensive technical literature on this subject and to Patent 2,561,489 concerned in other respects with similar phenomena.

Generally, it is a known phenomena that free electrons or other subatomic particles may exist or be created in many semiconducting or insulating materials and that such free electrons will endlessly spin or orbit in response to a magnetic field and at a rate of rotation determined by the magnitude of the static field.

It is also a known phenomena that such orbiting particles behave in the manner of a resonant circuit responsive to a polarized electromagnetic or radio wave occurring at their resonant frequency to absorb energy from the wave.

The spin-spin or spin-lattice relaxation effects may give rise to an energy dissipation in the manner of resistance in a simple electronic resonant circuit. In some configurations of matter used for recording the dissipated energy gives rise to heating of the material surrounding the paramagnetic material. In other material configurations, the stored energy may raise the energy level of the particle from the valence band to the conduction band. When a particle is in the conduction band it has mobility in the host material.

According to a preferred recording process of the invention, these phenomena are jointly employed to provide a tape or other record member that is presensitized to radio waves in the kilomegacycle frequency range. The record member is provided with a plurality of subatomic resonant areas dispersed along the record, with the orbiting particles in all areas being polarized in the same direction, or in other words, orbiting about spin axes that are parallel to one another. This specially prepared radio frequency sensitive tape is thereafter subjected to a static magnetic field of given intensity to tune the resonant areas to a given frequency that it is desired to record. After the record member has been prepared in this manner, the radio wave to be recorded is then directed to excite all of the resonant areas in a given region on the record whereby the energy from the exciting radio wave is absorbed by the resonant areas along the tape to store or record the radio signal. Since the resonating frequency of the different areas on the tape or member may be tuned to different frequencies by varying the static energizing magnetic field energizing that area, the magnitude of the static field along the member may be varied to tune the different areas to different resonant frequencies with the result that a modulated radio wave may be spectrally recorded on the member.

More specifically, where the radio wave to be recorded is comprised of a high frequency carrier wave that is modulated with an intelligence signal, a band of frequencies must be recorded to capture the intelligence since the radio wave is basically comprised, in this case, of a carrier wave together with sidebands that are spaced in frequency from the carrier wave. To record this information, the sensitized tape or record is energized by a nonuniform static magnetic field that progressively varies in intensity from one end of the record to the other. In this manner, the resonant areas energized by the less intense static field are tuned to resonate at a lower frequency, those at the opposite region of the record that are energized by a static magnetic field of greater intensity are tuned to resonate at a much higher frequency, whereas the resonating areas between these two extremes are progressively tuned from the lower to the higher frequencies. Accordingly, each of the frequency components of the radio wave, comprising the carrier and its sidebands, are recorded at different positions along the tape by being absorbed by different ones of resonating areas to provide the spectral distribution desired.

Referring now to the drawings for detailed consideration of one preferred process according to the invention, there is shown in FIGS. 1 and 2 a ribbon or tape base member 10, which may be made of Mylar or other suitable record material, on which is deposited a layer of wax 11 or other heat releaseable substance, containing a plurality of aligned crystals 12, uniformly dispersed along the tape. The crystals 12 are of certain semiconducting material or insulating material that is capable of providing free orbiting electrons or other subatomic particles therein.

In a second step generally illustrated in FIG. 3, the tape or record member 10 is irradiated with X-rays, neutrons, high energy electrons, or the like 13 from a suitable source such as 14 to bombard the crystals 12 in such manner that certain of the electrons contained in the atoms of the crystals 12 are freed from the atoms and may rotate, as indicated at 17, about the atom, a molecule, or a group of molecules within the crystal. In any one crystal such as 12, there may be many millions of free electrons developed during the irradiation step and such electrons and other subatomic particles, as may be liberated, rotate as at 17 at random speeds but in fixed orbit planes within the crystal lattice 12. During the irradiation step, the angle of incident radiation 13 determines the orbiting planes of the liberated subatomic particles and consequently by polarizing the irradiating source 14, all of the free subatomic particles within the lattice are polarized to orbit about spin axes that are aligned or parallel to one another.

In the following step generally indicated in FIG. 4, the tape 10 is then subjected to a static magnetic field 18 as shown by being introduced between the poles 16 of a magnet of suitable strength, as generally illustrated. The intensity of the magnetic field 18 controls the spin rate of rotation of the orbiting subatomic particles 17 within each crystal 12 thereby to rotate all of the particles within each crystal 12 at the same speed as determined by the intensity of the static field 18. It has been found that the relationship between the speed of rotation of the orbiting particles 17 and the magnetic field is substantially linear over a given range of field strength, and consequently when the crystals 12 are exposed to the static field 18, the orbiting free particles therein are all controlled to the same spin rate or are tuned to a given resonant frequency as determined by the intensity of the field.

Thus, after the record 10 has been prepared and sensitized as described above and has been subjected to a static magnetic field of given intensity, there is provided a plurality of resonant areas disposed along the length and width of the tape with each such area containing a vast number of subatomic resonant circuits and with all resonant circuits being aligned in parallel planes and tuned to resonate or respond to the same frequency.

In the next succeeding step indicated in FIG. 5, the tape 10 is then directly exposed to a polarized beam of the radio frequency signal to be recorded which beam is introduced by a waveguide 19 or the like, and is directed along the spin axes of the subatomic particles in each crystal 12. The radio beam is directed to expose or excite all of the crystals 12 in a given region of the tape 10, whereby since the crystals 12 and numerous resonant areas 17 therein have been polarized and tuned to the frequency of the radio signal, the orbiting particles within the crystals absorb energy from the radio wave at the resonant frequency to produce heat and other radiation. The heat being generated by the absorption of radio energy within each crystal raises the temperature of the crystal 12 to a degree sufficient to soften or partially melt the wax layer 11 or other heat releaseable substance retaining the crystals 12 to the tape base 10 whereby the various crystals 12 being so heated are released to move from their oriented positions on the tape and assume the disorineted and random positions illustrated as 12*a*, 12*b*, 12*c*, 12*d*, and the like, in FIG. 6.

As generally indicated above, the orbiting planes of the spinning particles 17 within each crystal are fixed within the crystal lattice 12 and consequently if the crystal lattices 12 become misaligned on the tape as indicated in FIG. 6, the orbiting planes of the spinning particles in the misaligned crystals 12*a*, 12*b*, 12*c*, 12*d*, etc., are displaced from those in the other crystals whereby the resonant areas in the disoriented crystals 12*a*, 12*b*, etc. are no longer in polarized alignment with the corresponding resonant areas in the remaining crystals 12. Thus, during the recording step shown in FIG. 5, the various crystals 12 on the tape 10 exposed to the radio beam are heated by the energy absorbed from the polarized radio beam, which heat in turn serves to soften or melt the wax layer 11 and permits the energized crystals 12*a*, 12*b*, etc. to be disoriented from one another on the tape and lose their polarized aligned arrangement thereon.

After exposure to the radio beam, the wax layer 11 or other similar heat releaseable material then hardens to maintain the displaced crystals 12*a*, 12*b*, etc., in their misaligned positions on the tape thereby to permanently record or store the energy obtained from the radio beam.

For later readout or playback of this information, as generally indicated in FIG. 7, the tape 10 is again subjected to a static magnetic field from magnets 16 for tuning the polarized free electrons or other orbiting particles to the same resonant frequency as before, and the tape 10 is concurrently interrogated or scanned by a weak radio beam from waveguide 19 located on one side of the tape 10. A suitable detector or pickup waveguide 20 is located on the other side thereof. As those positions of the tape 10 that have not received recorded information pass by the playback or detector waveguide 20, the weak radio beam being generated through waveguide 19 is absorbed by the oriented crystals 12, since the resonant areas thereon are still in alignment and have not been disturbed. Consequently, in regions where information has not been recorded, the energy from the weak interrogating radio beam is absorbed, and a signal does not pass through the tape to the receiver waveguide 20. However, when misaligned resonant regions on the tape, on which information has been previously stored pass by the playback area, the resonant areas in the disoriented crystals 12*a*, 12*b*, etc., are no longer polarized and in alignment with the interrogating radio beam from waveguide 19, and the signal from the interrogating radio beam is not absorbed by the orbiting particles in the crystals 12. Consequently, when a recorded region on the tape passes through the interrogating radio field, there is little or no absorption and this signal may pass through the tape 10 and be detected by the pickup or detector waveguide 20. As generally indicated the interrogating radio wave from waveguide 19 is at the same frequency as the recording radio wave and the static magnetic field, such as from magnets 16, is likewise at the same intensity as during the recording steps. Consequently, the radio wave being detected by the receiver waveguide 20 is a direct and identical reproduction of the recorded wave frequency.

In the basic process steps as described above, the tape or record member 10 is prepared and presensitized to receive and store only one given radio frequency, since all resonant regions 17 to be exposed to the beam are tuned by being subjected to a static magnetic field 18 of uniform intensity. Where it is desired to record a bandwidth of different frequencies, the modified step shown in FIG. 8 may be employed.

As shown in FIG. 8, the tape or record member 10 having the aligned crystals 12 thereon, embedded in a wax or other heat releasable layer 11, may be initially prepared in the same manner as illustrated in FIGS. 1 to 3, inclusive, and described above. However, instead of tuning the frequency of all resonant areas on the tape to the same radio frequency by means of a uniform amplitude static magnetic field as is shown in FIG. 4, different regions transversely across the tape 10 are subjected to a different amplitude static field than others. More specifically, the tape 10 is subjected to a nonuniform static magnetic field 18 by means such as placing the tape 10 transversely between progressively diverging pole pieces 22 and 23 of a permanent magnet. Accordingly, those regions on the tape at the right of FIG. 8, that lie between the closely spaced ends of the magnet pole pieces 22 and 23 are subjected to a greater intensity magnetic field whereas the ends of the poles 22 and 23 are spaced further apart lie within the lowest intensity magnetic field, and the magnetic field thus progressively increases in intensity across the tape from left to right. As generally discussed above, the orbiting rate or resonant frequency of the spinning particles 17 is proportional in the intensity of the static energizing field 18 to which the particles are subjected whereby the orbiting particles 17 or resonant areas at different positions transversely across the tape 10 are tuned to resonate at progressively lower frequencies from right to left. In this manner, when the tape 10 is subjected to a radio beam having integral components thereof being at different frequencies, a spectral distribution of the frequency components are recorded on the tape, with the higher frequency components being recorded progressively toward the right of the tape and the lower frequencies progressively toward the left of the tape. For example, if the tape is exposed to an amplitude modulated radio beam being introduced through waveguide 24, the radio beam components include a carrier frequency component together with upper and lower sideband components. In this instance, the central regions on the tape may be tuned to resonate at the carrier frequency and the opposite end regions on the tape progressively tuned toward the higher frequency of the upper sideband and the lower frequency of the lower sideband respectively, whereby all spectral components of the beam are recorded on the tape in the frequency domain.

In a similar manner, the tape may be tuned in any uniform or nonuniform pattern desired to record a variable frequency code or other form of intelligence merely by variably tuning the different resonant areas on the tape by providing a nonuniform static magnetic field configuration in the pattern desired.

According to the invention, a number of variations may be made in the manner of preparing and processing the record material to provide the resonant circuit areas thereon and in the latter steps of recording and playback of the intelligence.

As generally mentioned above, one group of materials capable of providing the resonant circuit areas may be crystals of certain semiconductor or insulator materials that are capable of producing free electrons or other subatomic particles therein. Generally, two different types of subatomic particle conditions may be created in such crystals; the first known as an F-center and the second, known as a V-center. In an F-center, an electron is bound to a negative ion vacancy and the electron rotates about an atom or molecule within the crystal lattice about a central axis of orbit. In a V-center, a hole is bound to a positive ion vacancy and the effect is generally the same. In both instances, the orientation of the orbiting plane of the subatmic particle is fixed within the crystal lattice and movement of the crystal by as little as 10° varies the polarized resonant condition of the orbiting particles.

F-centers are generally created in crystals of certain semiconductor or insulator materials by bombarding the crystal with high energy X-rays, neutrons, or ultra-violet rays. As is also known in the semiconductor field, the free electrons or other particles may be created within the crystal by introduced an impurity during the manufacture of the crystal. Known crystal materials that have the characteristics mentioned are potassium chloride, sodium chloride, quartz, diamonds (either natural or synthetic), as well as a large number of other materials which are presently employed in the solid state electronic fields. The synthetic diamonds are particularly interesting materials due to the fact that these materials are extremely temperature sensitive and will vary their solid state electronic characteristics in response to temperature changes as low as .002° centigrade.

A number of different organic materials are also known that may be irradiated by certain forms of radiation to produce ionization and free electrons and other subatomic particles therein. For example, paraffin wax itself has been ionized by beta radiation to produce such free electrons and ions therein which may be made to orbit and produce the subatomic resonant areas discussed above. In this case, the record member may be prepared of a base layer of Mylar or other suitable record material, together with a covering layer of paraffin wax alone without the need for crystals or other additives.

It is also known that colloidal crystals may be irradiated causing certain ionic bonds within the crystal to be broken during the irradiation to entrap free electrons, create free electrons therein or to render the electrons in a state of unpaired spin. Materials of this type and their condition after irradiation are illustrated in an article in The Applied Physics Journal, volume 21, No. 9, page 904, September 1950, by Watson and Preuss, entitled, "Motion Picture Studies of Electron Bombardment of Colloidal Crystals." Also in an article by Mayagawa and Gordy entitled, "Electron Spin Resonance in an Irradiated Single Crystal of Dimethylglyoxime," published in the Journal of Chemistry and Physics, volume 30, No. 6, page 1570, and dated June 1959, these characteristics in this type of crystal material are discussed.

With respect to the paraffin wax material alone, further data concerning this material may be found in an article by Andrew Bemant entitled, "Ionization of Paraffin Wax by Beta-Radiation," published in the Journal of Applied Physics, volume 20, No. 10, page 887, dated October 1949.

Still another group of materials which may be employed to form high frequency resonant areas on a tape or other record member are the free radicals, such as the radicals of ethyl, methyl, propyl, and hydroxide. The free radicals are fragments of molecules having uncoupled electrons, which may be made to orbit at predetermined speeds responsively to a static magnetic field in the same manner as the subatomic particle motion in irradiated crystals discussed above. Such free radicals also possess strong magnetic dipole moments. One of the most suitable free radicals is diphenylpicrylhydrazyl, which is stable at room temperature. A basic theory applied to the stability of free radicals is found in an article by J. L. Jackson entitled, "Dynamic Stability of Frozen Radicals 1, Description and Application of Model," published in the Journal of Chemistry and Physics, volume 31, No. 1, page 154, and dated July 1959; and in a second article by this author in the Journal of Chemistry and Physics, volume 31, No. 3, page 772, and dated September 1959.

Free radicals are obtainable at lower temperatures and superconductive temperatures and the record member may be prepared with such materials at these lower temperatures, if desired. For example, if hydrozoic acid is decomposed hydrothermally or electrically and the products of decomposition are cooled to 77° Kelvin, a deep blue solid condenses that is stable at this temperature and contains the free radical desired. If this free radical material is heated to 148° Kelvin or above, the deep blue solid condensate becomes white, and the resonance condition disappears. Consequently a sensitized record material may be prepared by coating the record with such free radical obtained by decomposing this acid at 77° Kelvin and maintaining the record and coating thereon at this temperature during recording and playback.

Free radicals offer certain advantages over the use of the crystals. Initially, the free radical materials do not possess any crystal structure requiring alignment on the tape base and most of free radical materials can be dissolved in a solute such as benzene and a coating thereof easily applied to the tape. Since the free radicals already possess subatomic particles, a record member prepared with these materials does not require irradiation, and this step in the process may be eliminated. Consequently, if free radicals are employed in forming the resonant areas on a record, the record member need only be subjected to a polarized static magnetic field to tune the resonant areas to the desired frequency and thereafter the record may be directly exposed to the radio frequency intelligence signal to record the signal. In this instance, the exposure to the radio frequency beam causes a catastrophic decay of the spin system in contrast to the manner discussed in prior paragraphs where the spin system was disordered when exposed to the beam.

Still another group of materials which may be employed to form the resonant areas on the tape are the colloidal metals which comprise very finely divided metals such as sodium that may be deposited and embedded in a heat releasable material such as paraffin in the same manner as the crystal materials discussed above.

Other materials such as graphite compounds of alkali or alkali earth metals, comprising alkali metals dissolved and dispersed in graphite may also be employed, as may the known maser crystal materials such as garnets that are supercooled to substantially absolute zero conditions.

Thus a relatively large number of semiconductor or insulator materials may be employed in practicing the invention that are capable of producing orbiting electrons or other subatomic particles after radiation, as well as a number of materials such as free radicals which may be processed by means other than high energy bombardment to produce such orbiting particles.

The free radical materials discussed appear particularly well siuted for recording and storage according to the invention due to the further fact that some of these materials possess a very narrow resonant band width, in the range of three megacycles, and such materials may be tuned by the static magnetic field to a resonant center frequency over a wide frequency band, ranging from about 1,000 megacycles to 40,000 megacycles.

The process step for destroying the resonant condition of the areas on the record member will also vary according to the materials forming the resonant areas on the record member. For example, if a free radical material such as hydrozoic acid is employed, decomposed, and cooled to 77° Kelvin as discussed above, to produce a deep blue solid material containing the free radical, the exposure of the record to the radio frequency beam is sufficient to heat the record above the critical temperature of 148° Kelvin thereby to destroy the free radical condition. In this case, the record member does not require an intermediate layer of wax or other heat releasable material but merely a coating or impregnation of the free radical in the supporting base. In the event that other materials, such as certain of the crystals are employed, the heating of the crystal upon exposure to the radio beam may not be sufficient to completely melt the wax layer or other heat releasable substance. In this case, the record member may be concurrently bombarded with an ultrasonic wave or be otherwise vibrated to disorient those of the particles that have been heated by the radio wave. The tape may also or alternatively be preheated to just below the softening temperature of the wax whereby the additional heat being generated by the absorption of the radio beam permits movement of the crystals as desired.

Many other variations may be made in the various process steps and in the materials employed without departing from the spirit and scope of the invention and accordingly, this invention should be considered as being limited only according to the following claims.

For purposes of the present invention, the term "free radical" as used herein covers a specific class of materials having particles comprised of one or more complete atoms that are uncoupled from their stable molecule and possess a net charge. Most of the presently known "free radicals" are highly unstable and will recombine to form the stable molecule but others such as DPPH referred to above are relatively stable for longer periods of time. This class of materials is to be distinguished from other spin resonant materials in that other spin resonant materials may have uncompensated parts of an atom, such as uncompensated electrons, but do not have uncoupled complete atoms as do "free radicals."

What is claimed is:

1. A method of directly recording radio frequency signals on a record member comprising the steps of: preparing the record with a semi-conductive material having a plurality of orbiting subatomic particles disposed at different areas on the record with the spin axis of the orbiting particles being parallel to one another, directing a static polarized field of given intensity along the spin axis of the particles to control the spin rate of the particles and thereby tune the orbiting particles to polarized resonant frequencies proportional to the intensity of the static field, and directing a polarized beam of the radio wave to be recorded along the axis of the orbiting particles, whereby the radio beam signals at the resonant frequencies of the particles are absorbed by the orbiting particles to vary the energy condition thereof and store the radio beam signals, said semi-conducting material being heated by the absorbed energy to permanently destroy the polarized relationship of the particles to the polarized radio beam.

2. In the process of claim 1, the step of preparing the record member being performed by forming the record member with a semi-conducting material having free radicals.

3. A method of directly recording radio frequency signals on a record member comprising the steps of: preparing the record with a semi-conductive material having a plurality of orbiting subatomic particles disposed at different areas on the record with the spin axis of the orbiting particles being parallel to one another, directing a static polarized field of given intensity along the spin axis of the particles to control the spin rate of the particles and thereby tune the orbiting particles to polarized resonant frequences proportional to the intensity of the static field, and directing a polarized beam of the radio wave to be recorded along the axis of the orbiting particles, whereby the radio beam signals at the resonant frequencies of the particles are absorbed by the orbiting particles to vary the energy condition thereof and store the radio beam signals, the step of preparing the record member being performed by supporting the semi-conductive material on the record member with a heat releasable substance whereby absorption of energy by the particles heats the substance to substantially release the material.

4. In the method of claim 3, the additional step of subjecting the record member to a disturbing force whereby upon heating of the substance in discrete areas by the absorbed energy, the material at said heated areas is displaced to vary the orientation of the orbiting particles therein.

5. A method of directly recording radio frequency signals on a record member comprising the steps of: preparing the record with a semi-conductive material having a plurality of orbiting subatomic particles disposed at different areas on the record with the spin axis of the orbiting particles being parallel to one another, directing a static polarized field of given intensity along the spin axis of the particles to control the spin rate of the particles and thereby tune the orbiting particles to polarized resonant frequencies proportional to the intensity of the static field, and directing a polarized beam of the radio wave to be recorded along the axis of the orbiting particles, whereby the radio beam signals at the resonant frequencies of the particles are absorbed by the orbiting particles to vary the energy condition thereof and store the radio beam signals, the step of preparing the record member being performed by forming the record member with semi-conducting material having a crystal lattice structure, and then irradiating the record member to dislodge the subatomic particles from the crystals with freedom to orbit about spin axes that are parallel to one another.

6. The method of preparing a record for directly recording radio waves having a high frequency in the range of free orbiting subatomic particles comprising the steps of: preparing a nonferromagnetic semi-conducting material having freely orbiting subatomic particles, and disposing said material on the record so that the orbiting subatomic particles are oriented in the same direction of polarization, the steps of preparing and disposing the semi-conducting material being performed by dissolving a free radical material in a solvent and depositing the product formed over the surface of the member.

7. In the method of claim 6, the steps of preparing and disposing the semi-conducting material on the member being performed by uniformly aligning and dispersing a plurality of crystals along the member and supporting the crystals to the member by a heat releaseable joining material, and irradiating the crystals with high energy subatomic particles to produce free subatomic particles therein.

8. In the method of claim 6, the steps of preparing and disposing the semi-conducting material being performed by disposing a layer of crystalline wax semi-conducting material along the member, and irradiating the layer with high energy subatomic particles in a polarized direction to produce free subatomic particles therein.

9. A method of permanently recording different microwave frequencies by spin resonance comprising the steps of: providing a series of separated regions of spin resonant material that respond to microwave radio fields to produce heat, magnetically tuning said regions to resonate at different frequencies, and applying a microwave field to said regions at one of the resonantly tuned frequencies to produce sufficient heat at said one tuned region to permanently destroy the resonant condition of that region.

10. A process for permanently recording and reproducing a radio beam in the space domain comprising the steps of: producing a series of spaced and electromagnetically sensitive resonant areas along an elongated member, each comprised of a plurality of orbiting subatomic particles with the particles being polarized to orbit in parallel planes, tuning the resonant areas to desired resonant frequencies by applying a static magnetic field of predetermined intensity thereto, and exciting the member with a radio beam polarized in the direction of the orbiting particles thereby to permanently destroy the resonant polarized condition of the resonant areas orbiting at the frequency of the radio beam and excited with the radio beam, and reproducing the recorded radio beam by detecting those of the resonant areas whose polarized resonant condition has been destroyed.

11. A method of directly recording a varying magnetic field as a spatially dispersed image in a crystalline semiconductor material comprising, irradiating a surface region of said material by actinic radiation to produce uncoupled subatomic particles therein, tuning said irradiated region into energy absorptive relationship with the varying magnetic field by applying to said material a tuning magnetic field, and directly illuminating said region by said varying field with the H component of the varying field being disposed right angles to the H component of the tuning magnetic field.

12. A method of directly and permanently recording a varying magnetic field as a spatially dispersed image in a free radical containing material comprising: applying a tuning magnetic field to said material over a spatial region thereof to tune different positions in said region into energy absorptive relation with the varying magnetic field, and illuminating the tuned region by the varying field to produce a heat image of the varying field in the free radical material sufficient to destroy the resonant condition of the material at those positions that are tuned to the frequency of the field.

13. A presensitized record member for responding to microwave signals comprising an elongated base having an extended area, a plurality of discrete crystals spaced from one another and supported in a heat releasable material being carried by the base, said crystal material being irradiated and containing uncoupled subatomic particles therein after being exposed to said radiation.

14. A presensitized record member for responding to microwave signals comprising an elongated base having an extended area, a plurality of discrete crystals separately dispersed over said area and supported in a heat releasable material carried by the base, said crystals containing impurities therein to provide uncoupled subatomic particles therein.

15. A presensitized record member for responding to microwave signals comprising an elongated base having an extended area, a crystalline wax being dispersed over said base and supported by said base, said record member being irradiated by actinic radiation to produce uncoupled subatomic particles in the wax.

16. A presensitized record member for responding to microwave signals comprising an elongated base having an extended area, a paramagnetic material supported by the base and dispersed over said area, said paramagnetic material comprised of colloidally suspended metals being carried by said base, and said record member being irradiated by actinic radiation to produce uncoupled subatomic particles in said colloidal metals particles.

17. A presentized record member for responding to microwave signals comprising an elongated base having an extended area, a paramagnetic material supported by the base and dispersed over said area, said record member being supercooled and said paramagnetic material providing uncoupled subatomic particles therein at said supercooled temperatures, said paramagnetic material responsive to heating above the supercooled temperature to couple said subatomic particles.

18. A presensitized record member for responding to microwave signals comprising an elongated base having an extended area, a paramagnetic material supported by the base and dispersed over said area, said paramagnetic material comprising an alkali earth metal dissolved and dispersed in a graphite binder, said record member being irradiated by actinic radiation, thereby to provide uncoupled subatomic particles in the alkali earth metal.

19. A process for recording intelligence comprising: subjecting a crystalline material to actinic radiation to produce uncoupled subatomic particles in said material, exposing the irradiated material to a signal having a magnetic field which varies according to a sequence of intelligence, and exposing successive areas of said irradiated material to said field in prescribed time relation to the variation of said intelligence.

20. A process for recording intelligence comprising subjecting a substantially nonelectrically conducting material to actinic radiation to produce uncoupled subatomic particles in said material, and subsequently exposing the irradiated material to a signal having a magnetic field which varies according to a sequence of intelligence, and exposing successive areas of said irradiated material to said field in prescribed time relation to the variation of said intelligence.

References Cited by the Examiner

UNITED STATES PATENTS

| | | | |
|---|---|---|---|
| 2,952,503 | 9/1960 | Becker | 340—174.1 X |
| 3,155,941 | 11/1964 | Mims | 340—173 |

IRVING L. SRAGOW, *Primary Examiner.*

R. M. JENNINGS, R. G. LITTON, T. W. FEARS, *Assistant Examiners.*